R. B. KLAPPER.
METER READING DEVICE.
APPLICATION FILED OCT. 19, 1912.

1,093,193.

Patented Apr. 14, 1914.

WITNESSES

INVENTOR
Russell B. Klapper,
his Attorney

UNITED STATES PATENT OFFICE.

RUSSELL B. KLAPPER, OF MONTICELLO, INDIANA.

METER-READING DEVICE.

1,093,193.  Specification of Letters Patent.  Patented Apr. 14, 1914.

Application filed October 19, 1912. Serial No. 726,694.

*To all whom it may concern:*

Be it known that I, RUSSELL B. KLAPPER, a citizen of the United States, residing at Monticello, in the county of White and State of Indiana, have invented new and useful Improvements in Meter-Reading Devices, of which the following is a specification.

My present invention relates to devices to be used in reading meters and includes dials and indicators complementing those on the meters to be read, so that the indicators of the device may be set according to those on the meter. Such action operates character wheels so that the reading may be accomplished without reference to the graduations on the dials, but by visually noting the characters on the wheels which appear in suitable sight openings formed in casing inclosing the mechanism.

The principal objects of my invention are to provide a device whereby a person not familiar with the purpose of graduations and characters on meters now in common use may quickly and accurately read the same in familiar characters; to provide a device whereby the consumption of fluid or material passing through the meter during a certain period may be determined; and, in general, to provide a device which is simple in construction, efficient in action and inexpensive to manufacture.

Figure 1:
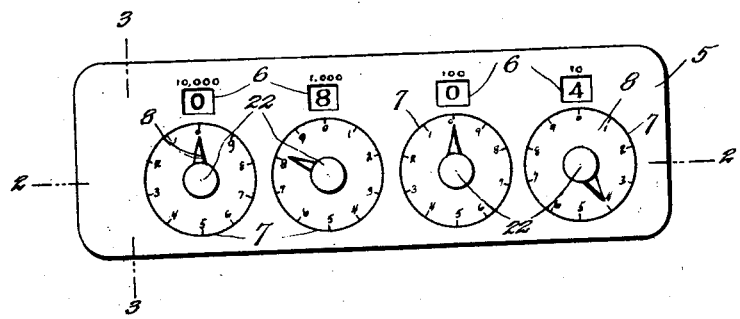
Figure 2:
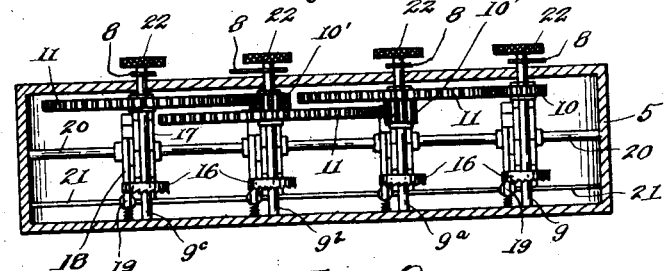
Figure 3:
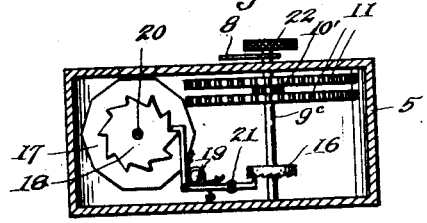
Figure 4:
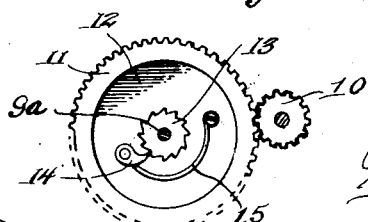

In the drawing, forming a part of this specification:—Figure 1 is a front elevation of the device embodying my invention. Fig. 2 is a longitudinal sectional view on the line 2—2 of Fig. 1. Fig. 3 is a cross sectional view on the line 3—3 of Fig. 1. Fig. 4 is a plan view of a spur gear together with coupling mechanism used in connection with my device.

Similar characters refer to similar parts throughout the views.

A suitable body portion 5, which may be in the form of a casing and having a plurality of sight openings 6, is provided. For each sight opening a dial 7 is provided, which dials are formed complementary to the dials on the meter in connection with which the device is to be used. In the example shown, the dials each have ten graduations and four dials are disclosed, but it is to be understood that this may be altered without departing from the spirit or scope of my invention. The dials have suitable indicators 8 mounted upon spindles 9, $9^a$, $9^b$ and $9^c$ which are carried by, and extended into the body portion 5. The spindle 9 is hereinafter termed the master spindle. Assuming that the dials represent tens, hundreds, thousands and ten thousandths, as indicated, master spindle 9 has rigidly secured thereto a pinion 10. Spindle $9^a$ carries loosely a comeshing spur gear 11 and this spur gear is provided with mechanism, to be subsequently described, whereby it may be coupled to spindle $9^a$, so that upon movement of master spindle 9, spindle $9^a$ is driven at a positive ratio through pinion 10 and gear 11, which have a velocity ratio of $\frac{1}{10}$, in the example shown. Gear 11 carries with it a pinion 10' serving a function similar to that of pinion 10 and comeshing with a gear 11 loosely mounted on shaft $9^b$. This arrangement is provided throughout the device, but the last spindle $9^c$ does not require a pinion 10'. It is to be noted that the gears move in unison and that they may be driven at a positive ratio from pinion 10 according to the velocity ratio of the complementary indicator spindles of the meter, the device is to act in conjunction with. It is to be further noted that when the gears 11 are coupled to their respective spindles the indicators carried by the latter move accordingly.

In practice, it is desirable that, at times, the spindles $9^a$, $9^b$ and $9^c$ be capable of rotation independently of the gears and pinions they carry, and with this end in view, I provide coupling mechanism such as that disclosed in Fig. 4 of the drawing, whereby the said spindles may move with the gears or independently thereof. This mechanism as disclosed is preferably disposed in a recess 12 in each gear 11 and includes a ratchet wheel 13 rigid with the spindle it is to act in conjunction with; a pawl 14 coacting with said ratchet wheel; and, a spring 15 acting upon said pawl to hold it in operative relation to the ratchet wheel, and compel the same to rotate with gear 11, but yieldable to permit the ratchet wheel to rotate independently of the latter in the same direction as it would if actuated through gear 11 upon the indicator being moved manually by direct manipulation of its thumb wheel 22.

It is to be noted that, as disclosed, the movement of master spindle 9 is in a clockwise direction, and imparts movement to spindles $9^a$ and $9^c$ in a counter clock-wise direction, and to spindle $9^b$ clock-wise, all at a positive ratio.

Each dial has registering mechanism adapted to present a character at the sight opening in proximity thereto. This registering mechanism may comprise a crown ratchet wheel 16 secured to the spindle of the respective dial; a wheel 17 having characters thereon; a ratchet wheel 18 rotatable with said character wheel; and an articulated pawl 19 vibrated by wheel 16 and acting upon the ratchet wheel 18 to drive the character wheel at a positive ratio from the spindle. All wheels 17 may be mounted upon a spindle 20 carried by the body portion 5, and likewise, the pawls 19, carried by a spindle 21. In the example shown, each wheel 17 has ten characters thereon,—0 to 9—according to the graduations on the dial, and the driving mechanism operable intermediate the dial spindle and character wheel is such as to advance the latter one character as the indicator 8 moves from one graduation to the next adjacent graduation. Thumb wheels 22 may be provided on the dial spindles to facilitate actuating the same.

The operation of the device, in order to read a meter, is as follows: The person operating the device first rotates the spindle 9, as by thumb wheel 22, to position the indicator 8 according to the respective indicator of the meter concerned. The spindles 9ª, and 9ᵇ and 9ᶜ are then successively rotated by manipulation of their respective thumb wheels 22 to position their respective indicators approximately according to the indicators on the meter concerned. The actuation of these spindles operates their respective registering mechanisms to provide for reading of the meter in familiar characters.

Should it be desirable to determine the amount of fluid flowing through a meter during a certain period, the device may be set according to the indicators of the meter at the beginning of a period, and the reading at sight openings 6 noted. At the end of the period in question, the device may be set according to the indicators of the meter and the reading at sight openings 6 again noted, from which data, the subtracting of the first reading at the sight openings from the second reading gives the quantity of fluid passing through the meter during the given period.

Considering further the use to which a device constructed according to my invention may be put, if it is desired to determine the amount of fluid passing through a meter for a very short period and by constant attention to the meter, the operator may by merely manipulating the thumb wheel 22 and spindle 9 follow the successive movement of the indicator on the meter complementing the indicator 8 on the spindle 9. He may then obtain accurate readings at all of the sight openings since the gears and pinions hereinbefore described advance all the indicators 8 at a positive velocity ratio according to the movement of spindle 9, through the coupling of gears 11, shown in Fig. 4 of the drawing.

Changes may be made in details without departing from the spirit or scope of my invention; but,

I claim:—

1. In a meter reading device, the combination of a plurality of dials, indicators for said dials, mechanism for imparting movement of one of said indicators to all of said indicators in unison at a positive ratio, but permitting independent movement of any of the indicators one from another, and registering mechanism associated with each of said indicators and actuated upon movement thereof for registering the relative position of the respective indicator with respect to its dial, substantially as and for the purpose set forth.

2. In a meter reading device, the combination of a plurality of dials, indicators for said dials, a spindle for each dial carrying its respective indicator, means carried by said spindles for imparting movement of one to all spindles in unison at a positive ratio, but permitting independent movement of any spindle one from another, and registering mechanism for each dial operatively connected with the spindle of its respective indicator, to register the relative position of the latter with respect to its dial, substantially as and for the purpose set forth.

3. In a meter reading device, the combination of a plurality of dials, an indicator for each dial movable independently with respect to each other, and registering mechanism associated with each of said indicators and actuated upon movement thereof for registering the relative position of the respective indicator with respect to its dial, substantially as and for the purpose set forth.

4. In a meter reading device, the combination of a plurality of dials, an indicator for each dial movable independently with respect to each other, a spindle for each dial carrrying its respective indicator, and registering mechanism for each dial operatively connected with the spindle of its respective indicator to register the relative position of the latter with respect to its dial, substantially as and for the purpose set forth.

5. A meter reading device, comprising in combination, a body portion having dials, an indicator for each dial, a spindle for each indicator carried by said body portion, a pinion rigid on one of said spindles, a train of gears and pinions carried by the other spindles and adapted to be driven from said first mentioned pinion at a positive ratio, coupling mechanism carried by gears of said train and coacting with the spindles they are carried by to impart movement thereto, but permitting independent movement of the said spindles one from another, and registering mechanism for each dial operatively connected with the spindle of its respective indicator to register the relative position of the latter with respect to its dial, substantially as and for the purpose set forth.

6. A meter reading device comprising in combination, a body portion having a plurality of dials, an indicator for each dial, a master spindle for the first of said indicators, secondary spindles, one for each of the other of said indicators, a pinion for said master spindle, a gear for each of said secondary spindles loosely carried thereby, the gear on the secondary spindle next adjacent said master spindle comeshing with the said pinion thereof, pinions rotatable with said gears, the pinion rotatable with any particular gear comeshing with the next adjacent gear to provide a train of gears, means for coupling said gears to their respective spindles to actuate the same in a predetermined direction but permitting the spindle to be manually and independently rotated in the said predetermined direction, and registering mechanisms for each dial operatively connected with the spindle of its respective indicator to register the relative position of the latter with respect to its dial, substantially as and for the purpose set forth.

RUSSELL B. KLAPPER.

Witnesses:
  EDNA TURNER,
  W. S. BUSHNELL.